United States Patent [19]
McFadden

[11] 3,925,854
[45] Dec. 16, 1975

[54] ALIGNMENT CLAMP

[76] Inventor: James D. McFadden, 2300 Jefferson Ave., Anchorage, Alaska 99503

[22] Filed: Sept. 23, 1974

[21] Appl. No.: 508,673

Related U.S. Application Data

[63] Continuation-in-part of Ser. No. 404,491, Oct. 9, 1973.

[52] U.S. Cl.................. 24/81 PE; 219/161; 269/43
[51] Int. Cl.². A44B 21/00; B25B 1/20; F16L 13/02
[58] Field of Search ..... 24/81 PE, 263 DL, 248 SA, 24/249 HA, 249 WL, 248 CR, 243 AB; 285/21, 286, 287; 219/161; 269/37, 43

[56] References Cited
UNITED STATES PATENTS

| | | | |
|---|---|---|---|
| 408,479 | 8/1889 | Giles | 24/248 SA UX |
| 995,411 | 6/1911 | Morrill | 24/248 SA UX |
| 1,060,477 | 4/1913 | Meyers | 219/161 X |
| 1,851,025 | 3/1932 | Weiskopf | 269/37 |
| 2,382,478 | 8/1945 | Guthrie | 24/243 AB X |
| 3,037,258 | 6/1962 | Stokes | 24/263 DL X |
| 3,105,281 | 10/1963 | Doherty | 24/263 DL X |
| 3,166,664 | 1/1965 | Paton et al. | 219/161 X |
| 3,512,229 | 5/1970 | Phariss | 219/161 X |
| 3,711,920 | 1/1973 | Simmons | 269/43 X |

FOREIGN PATENTS OR APPLICATIONS

| | | | |
|---|---|---|---|
| 495,273 | 11/1938 | United Kingdom | 269/43 |

Primary Examiner—Donald A. Griffin
Attorney, Agent, or Firm—Klarquist, Sparkman, Campbell, Leigh, Hall & Whinston

[57] ABSTRACT

An alignment clamp holds a pair of pipe sections or structural shapes in alignment for welding and includes a band which is secured to a first pipe section, the band being larger in diameter than such first pipe section and spaced from the first pipe section. The band comprises two segments which are hingedly connected and adapted to be locked over the first pipe section. Mounted upon the band are pairs of lever dogs pivotally supported by the band, wherein means are employed for rotating said dogs relative to the band causing forward ends of the dogs to grasp a second pipe section in alignment with the first. The lever dogs extend outwardly from the second pipe section to provide a gap under the dogs between the pipe sections to permit welding therebetween. In an embodiment particularly adapted for larger pipe sizes, the band is spaced from the first pipe section by spacing means comprising hydraulic cylinder and piston means operable conjointly with the means for rotating said dogs so that the band is simultaneously tensioned relative to the first pipe section.

17 Claims, 15 Drawing Figures

ALIGNMENT CLAMP

CROSS REFERENCE TO RELATED APPLICATION

This is a continuation-in-part application of copending U.S. patent application Ser. No. 404,491 filed Oct. 9, 1973, by James M. McFadden entitled "Pipe Alignment Clamp".

BACKGROUND OF THE INVENTION

In the welding of pipes for pipe lines and the like it is desirable to accomplish a fit of the joints in the shortest possible time in order to reduce production costs to a minimum. Various devices have been employed for holding the pipe sections and keeping them in coaxial alingment while welding is accomplished, including mandrel type means which may be disposed internally of a pair of pipe sections and removed after the welding is completed. Unfortunately, this type of structure is not adapted to "ells", T's, and various pipe fittings where the mandrel either cannot be inserted or cannot be removed after the welding is accomplished.

Various devices have been suggested or employed for attachment to the exterior of the pipe sections. Such devices either make it difficult to accomplish the weld without the removal of the clamping device before the weld is completed because of the lack of access to the joint, or considerable time may be consumed in attaching such devices to the pipe sections. In one case, such a device includes arched bars which are chained to the exterior of the pipes.

SUMMARY OF THE INVENTION

In accordance with the present invention, a band is removably attachable to one of the pipe sections and is provided with movable dogs having ends for engaging the second of the pipe sections. Operating means, suitably mounted upon the band, are employed for bringing about relative movement between the band and the aforementioned ends of the movable dogs. In a particular embodiment, the band comprises two hingedly related semi-circular segments which may be separated to permit placement of the band upon a first pipe section and to permit removal of the same therefrom, with the band also being provided with locking means for engaging the two semi-circular segments in clamping relation with the first of the pipe sections. In one embodiment, the means for providing relative movement between the band and the movable dogs comprises hydraulic cylinder means mounted upon the band for rotating the dogs which are pivotally supported by the band. In another embodiment, the means for bringing about the relative movement comprises threaded bolt members for engaging the band and the dogs pivotally mounted upon the band.

In accordance with an aspect of the present invention, larger sized pipe sections are aligned employing a band provided with spacing means which apply tension to the band at the same time the aforementioned dogs are operated. In this manner, irregularities in the band resulting from a high-low condition in the second pipe section are minimized and the correct alignment of large pipe sections is enhanced.

According to a further aspect of the present invention, structural shapes such as H beams or I beams, particularly as employed for piling, are advantageously aligned before joining together. In this embodiment, a band, similar in outline configuration to the cross sectional outline of the structural shape, is adapted to be secured to a first structural shape section, while movable dogs grasp a second structural shape section in alignment whereby the two can be welded together.

The present device has the advantage that it is very quickly installed upon a pipe or beam and is readily operable for bringing about the correct alignment and support needed for welding. Also, access completely around the joint between two pipes or beams is provided.

It is accordingly an object of the present invention to provide an alignment clamp capable of coaxially aligning pairs of pipe sections, with the capability of rapid repetition of the clamping sequence.

It is another object of the present invention to provide an alignment clamp with leverage capacity suitable for alignment and support of large diameter pipe sections, i.e. of 48 inch diameter pipe and larger.

It is a further object of the present invention to provide an alignment clamp readily adjustable to special pipe sizes.

It is another object of the present invention to provide an alignment clamp wherein adjustable clamping leverages are possible so as to afford the rotatability of pipe sections in a semi-clamping arrangement before welding therebetween is accomplished.

It is another object of the present invention to provide an alignment clamp for pipe sections for use in large diameter pipe lines and the like including clamping devices which are hydraulically operated.

It is another object of the present invention to provide a combination alignment clamp and stabbing guide for piling.

It is another object of the present invention to provide an improved alignment clamp for pipe sections which requires the minimum of adjustment as the clamp is transferred from joint to joint.

It is another object of the present invention to provide an improved alignment clamp for pipe sections which is easily hand operated.

It is a further object of the present invention to provide an improved alignment clamp for pipe sections having the capability of correcting for high and low spots or out-of-round conditions of the pipe sections.

It is another object of the present invention to provide an improved alignment clamp for mounting on a first section of large diameter pipe which is to be aligned with a second pipe section, wherein said clamp is adapted to have added tension applied thereto relative to the first pipe section, whereby to eliminate or minimize distortion in the clamp and enhance alignment of pipe sections.

It is a further object of the present invention to provide an improved alignment clamp for aligning structural shapes, for example as used for piling, whereby sections of piling can be rapidly welded together.

It is another object of the present invention to provide an improved alignment clamp employing hydraulically operated dogs for grasping a pipe or structural shape, wherein said dogs are operable by means of an improved hydraulic cylinder and piston construction.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figure 1:
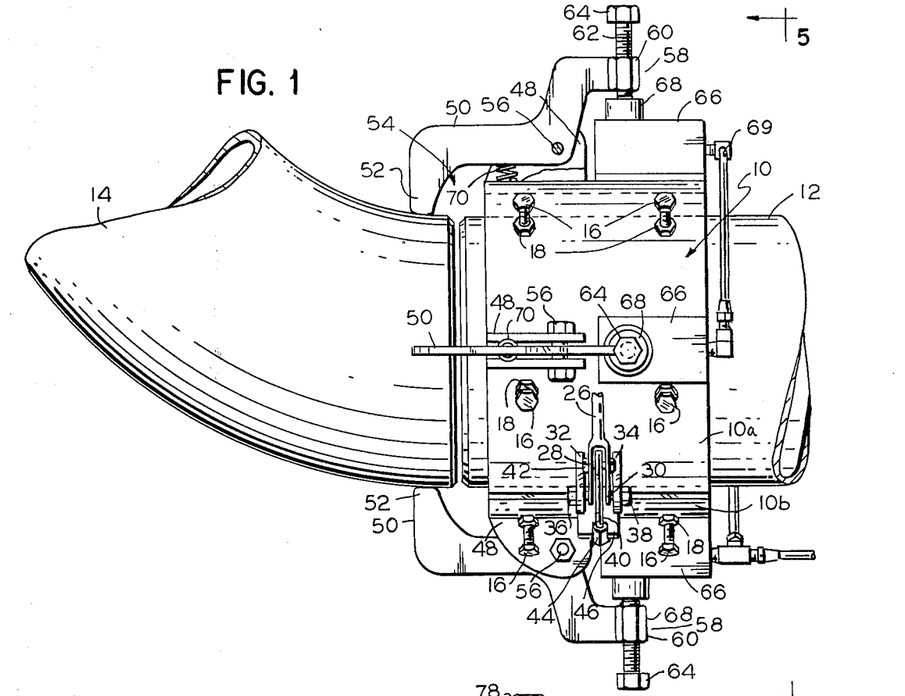
FIG. 1 is a side view of a pipe alignment clamp according to the present invention.
Figure 5:
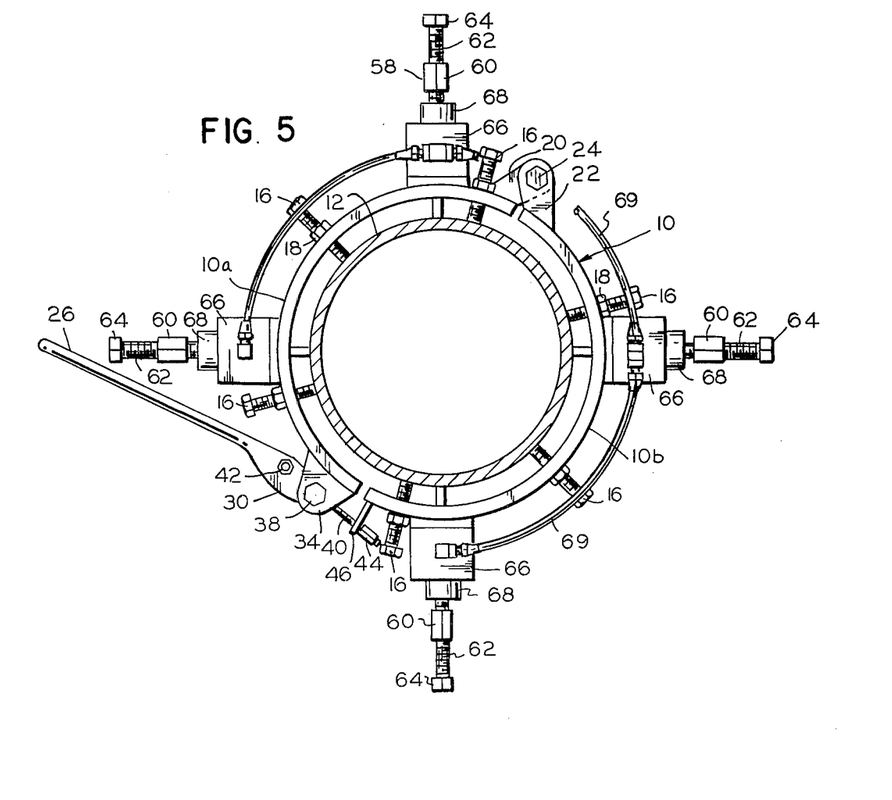
FIG. 5 is an end view of the FIG. 1 alignment clamp, such view being taken at 5—5 in FIG. 1.

Referring to the drawings and particularly to FIGS. 1 and 5, an alignment device according to the present invention comprises a cylindrical steel band 10 adapted for attachment to a first pipe section 12 for bringing about the coaxial alignment between the same and a second pipe section 14 facilitating the welding together of the pipe sections. Pipe section 14 comprises an ell in the FIG. 1 embodiment, but may alternatively comprise a straight pipe, pipe fitting or the like. Band 10 is larger in inside diameter than the outside diameter of pipe section 12, and is provided with a plurality of centering bolts 16 disposed in rows near the forward and rearward edge of the band, and in diametrically opposing pairs on the opposite sides of the band. In the illustrated embodiment, these centering bolts are conveniently positioned at 60° intervals, although it is understood a greater or lesser number of centering bolts could be employed. Each bolt threadably engages a mating nut 18 welded into an aperture in band 10 whereby the bolt 16 may be rotated at its hex head from outside the band 10 for causing the forward end of the bolt to approach and engage the exterior of pipe section 12. In this manner, the band is securely held to pipe section 12, and by adjusting the bolts 16, irregularities and an out-of-round condition in the pipe section may be corrected.

The band 10 is composed of a pair of semi-circular segments 10a and 10b (seen most clearly in the FIG. 5 end view) which are hingedly connected. Overlapping hinge brackets 20 and 22 are welded at ends of segments 10a and 10b respectively, proximate the forward and rearward edges thereof, and the brackets are joined by a pivot bolt 24 extending therethrough in a direction parallel to the central axis of the band 10. Diametrically opposite bolt 24, the band is provided with a locking means, here comprising a lever 26 bifurcated at 28 and 30 where the same is pivotally engaged between ears 32 and 34 mounted upon the band 10. The lever rotates in a direction perpendicular to the axis of band 10 and about the axis provided by bolts 36 and 38 which pivotally connect the lever to ears 32 and 34.

A hooking member 40 extends between the bifurcated ends of lever 26 where it is pivotally secured therebetween by a bolt 42 at a point farther out the lever arm than the pivot provided by bolts 36 and 38. This hooking member is suitably threaded at the opposite end thereof where it receives an elongated hex nut 44 adapted to engage the remote side of a lug 46 provided with a slot through which hooking member 40 may extend. Lug 46 is mounted on semi-circular segment 10b. In locking the two segments 10a and 10b together, the hooking member 40 is inserted in the slot in lug 46 with the lever 26 disposed more or less radially outwardly from the axis of band 10. The lever 26 is then rotated in a clockwise direction, as viewed in FIG. 4, into an over-center locking position as illustrated. At this time, the centering bolts 16 should firmly engage the exterior of the pipe section 12.

Radially disposed about the band and toward the edge thereof proximate the joint between the two pipe sections are located upstanding steel ears 48 each of which pivotally supports a lever type dog 50 having a forward end 52 adapted for grasping the side of second pipe section 14. The lever type dogs 50 are positioned in opposing, diametrically opposite pairs and a total of four are illustrated, although it is understood that a greater number could be employed if so desired particularly for large size pipe. The lever type dogs extend radially outwardly from the first end thereof in the region of the joint between the two pipe sections to provide an access area generally indicated at 54 permitting welding of the joint between the two pipe sections. In the particular embodiment, a lever type dog is L-shaped between the first end 52 and bolt 56 by means of which the dog is pivotally connected in each case to an ear 48. Although one ear 48 may be provided for each dog 50, it is preferred that a pair of such ears be disposed one on each side of the dog, with the bolt 56 extending therebetween and through an aperture in the dog. Each lever type dog further extends radially outwardly from the pivot provided, and then longitudinally again to a second end 58 onto which a hex shaped threaded nut 60 is welded. Threadably adjustable rods 62 engage nuts 58 and are each provided with a hex head 64 whereby the opposite end of each rod 62 is adjustable toward and away from the axis of band 10. Mounted therebelow on band 10 is a hydraulic cylinder 66 for operating a hydraulic piston rod 68 in the direction of the aforementioned adjustable rods 62, whereby to force the lever dogs about the pivot established by bolt 56 causing the first ends 52 thereof to grasp the exterior of second pipe section 14. The hydraulic cylinders 66 are supplied hydraulic fluid via a line 69 which suitably connects to a remote hand pump, or, in conjunction with an air boosting cylinder, to a hydraulic system to permit rapid operation of the lever type dogs in clamping relation to pipe section 14. Coil springs 70 are disposed between the lever type dogs 50 and the band 10 proximate the forward end of the band next to the joint between the two pipe sections for normally urging the dogs away from pipe section 14.

In employment of the device described, the centering bolts 16 are adjusted for at least approximately engaging the side wall of a first pipe section 12, and the band 10, in unlocked open condition, is placed upon the pipe section 12. Then, the locking means is operated by inserting hooking member 40 into lug 46, and the lever 26 is rotated for drawing up the band 10 and producing firm engagement between centering bolts 16 and pipe section 12. The second pipe section 14 is moved into approximate coaxial relation with the first pipe section 12, and then the hydraulic cylinders are operated for immediately and simultaneously pivoting the dogs so that first ends 52 grasp the pipe section 14 in aligned coaxial relation. The adjustable rods 62 are employed for making initial adjustments, adjusting for out-of-round condition of pipe section 14 or the like. Welding is then accomplished around the joint between the two pipe sections, with access being had all the way around the joint including the space provided by opening 54.

Alternatively, in some situations it is necessary to employ variable clamping, so that pipe section 14 is held lightly in coaxial alignment but can be rotated to a specified orientation required in the pipe fabrication. For this purpose, an air pressure control valve may be employed in regulating pressure to an air boosting cylinder as mentioned above provides a lesser pressure at first while the pipe section 14 is oriented, and then the air pressure control valve regulating pressure to the air boosting cylinder is increased to effect maximum delivery of clamping force to the clamping dogs.

When the welding has been accomplished, the hydraulic pressure is released, and spring 70 will force the lever type dogs 50 away from the pipe section 14. Then, lever 26 is operated to unlock the band 10 and the two segments 10a and 10b are hinged apart so the band can be completely removed from pipe section 12. The same device can then be rapidly applied in the same manner described above to another pipe section along a pipe line. For example, the band 10 can then be attached to the remote end of pipe section 14. The centering bolts 16, substantially adjusted for the diameter of pipe being employed, will not have to be substantially readjusted for each clamping and welding operation, although as described above the same are useful in correcting for out-of-round conditions or the like. It is seen that with the device according to the present invention, rapid concentric clamping of pipe sections is achieved. This enables a considerable increase in the speed of welding joints in pipe line construction.

Figures 2, 3:
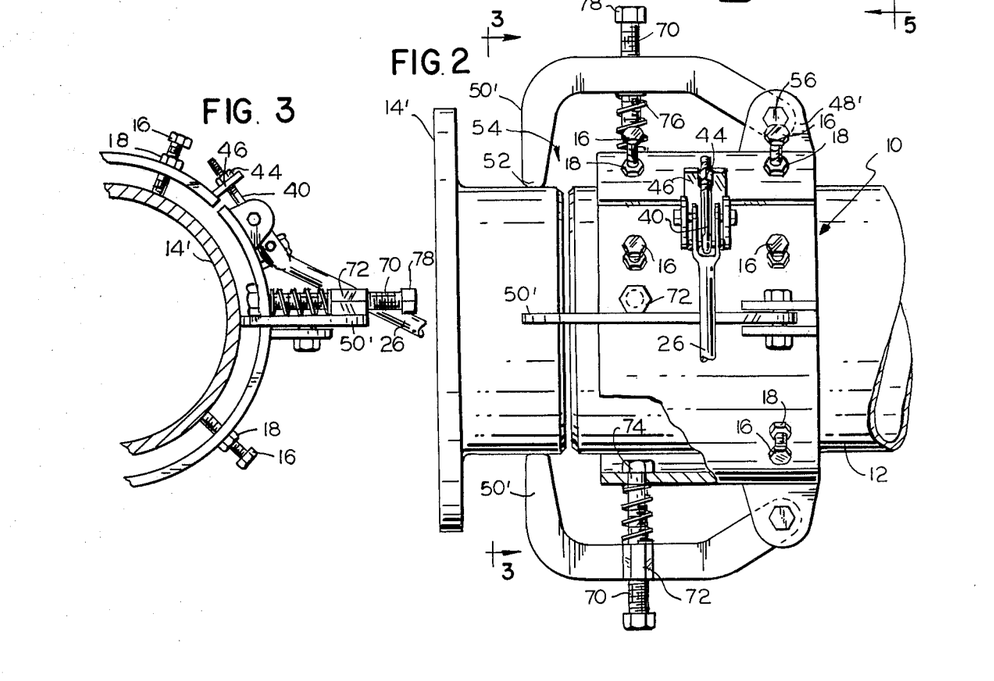
FIG. 2 is a side view of the pipe alignment clamp according to a second embodiment of the present invention.
FIG. 3 is a partial end view of the FIG. 2 device.

A second embodiment of the present invention is illustrated in FIGS. 2 and 3 and is utilizable especially for smaller sizes of pipe. This device is substantially similar to the one described in connection with FIGS. 1 and 5, and similar elements are referred to with the same or primed reference numerals. The device of FIG. 2 differs in that mechanically adjustable lever type dogs 50' are employed rather than hydraulically operated dogs, and the dogs are pivotally connected by means of bolts 56' to ears 48' positioned at diametrically opposite locations around band 10. The ears 48' are located on the far end of the band 10 from the joint between the two pipe sections 12 and 14', wherein section 14' comprises a pipe fitting in this illustration. The dogs 50' are nearly C-shaped and the operating means comprise threaded adjustable bolts 70 which threadably engage long nuts 72 welded toward the approximate center of the C-shaped dogs 50', near the forward end of the band and toward the junction between the two pipe sections. The threaded bolts 70 extend radially inwardly through apertures in band 10 and are provided on their under side with heads 74 preventing outward radial withdrawal of the bolts 70. The bolts are also surrounded by coil springs 76 which act to force the dogs 50' in an outward direction. The threaded bolts 70 also include hex heads 78 on the outwardmost end thereof which may be rotated for drawing up the lever dogs 50' to bring their first ends 52 into grasping engagement with pipe section 14'. The operation of the device illustrated in FIGS. 2 and 3 is slightly different from that of the device according to the first embodiment, in that the lever type dogs 50' are adjusted for the first welding of two pipe sections of a given diameter and then this adjustment is more or less maintained as subsequent pipe sections are welded, unless the need arises to compensate for an out-of-round condition. Thus, the band 10 is first placed on a pipe section 12, and lever 26 is rotated as hereinbefore described, with hooking member 40 engaging lug 46, for drawing up the centering bolts 16 against the exterior of pipe section 12. The centering bolts 16 are adjusted to compensate for undesired out-of-round of pipe section 12. Pipe section 14' is then approximately located, and bolts 70 are rotated until ends 52 of dogs 50' engage pipe section 14' for holding the same in coaxially aligned condition. After the welding is complete while the pipe sections are thus coaxially aligned, lever 26 is rotated in the reverse direction and the segments 10a and 10b of band 10 are hingedly rotated with respect ot one another so the band can be removed from the area of the welded joint. Then, the same device can be employed to hold two pipe sections having substantially the same diameter without having to readjust bolts 70 to a material extent. Thus, the band 10 is merely locked in place by means of lever 26 with the pipe section 14' also in place and the lever type dogs 50' should at this time grasp the exterior of pipe section 14'. Some minor adjustment may be required, especially in the case of an out-of-round condition, but in general the utilization of this FIG. 2 embodiment is very rapid and does not require much adjustment from joint to joint.

Figure 4:
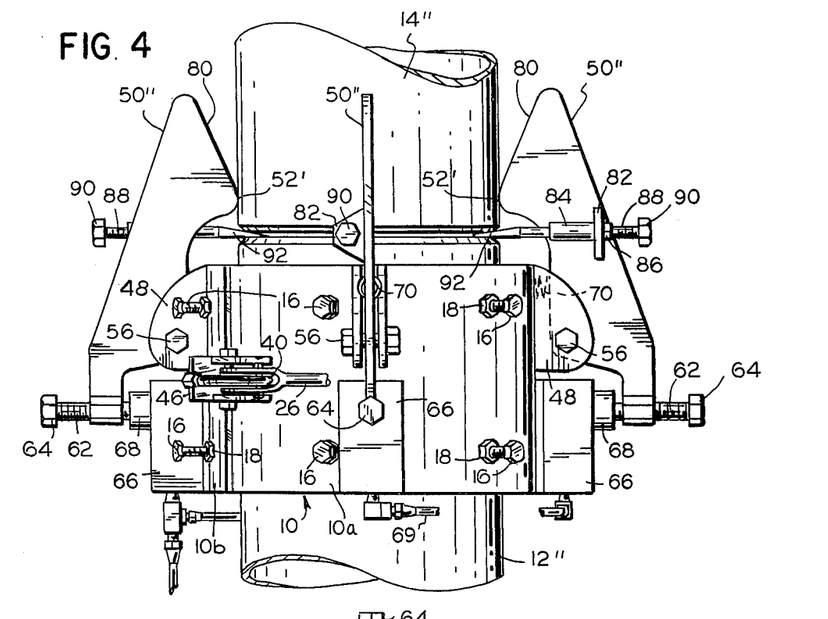
FIG. 4 is a side view of a pipe alignment clamp according to a third embodiment of the present invention particularly adapted for pipe pilings.

Referring to FIG. 4, yet another embodiment of the present invention is illustrated wherein like parts are referred to employing similar reference numerals. This embodiment is particularlly adapted for pipe piling wherein the second section of pipe piling 14'' is to be welded upon a lower section of pipe piling 12''. The clamping device according to the present invention operates in substantially the same manner as hereinbefore described for the embodiment of FIGS. 1 and 5. The FIG. 4 embodiment is additionally provided with lever type dogs 50'' having first ends 52' for grasping pipe section 14''', but with the lever type dogs extending longitudinally beyond the said ends 52' where the dogs taper outwardly at 80 to provide a "stabbing guide" configuration for initially engaging the pipe section 14''. As the pipe section 14'' is lowered towards pipe section 12'', the tapered region 80 of the lever dogs guide the pipe section 14'' into place.

The lever dogs 50'' are further supplied with brackets 82 welded onto the sides thereof supporting tubular sleeves 84 and a nut 86 welded onto each bracket and threadably engaging a spacer 88 having a threaded shank and a head 90. The spacers extend through the tubular sleeves 84 and are tapered at their forward ends 92 where the spacers are adapted to engage the upper edge of pipe section 122''. The spacers are moved radially inwardly to the point where the tapered ends provide the spacing desired between pipe section 12'' and pipe section 14'' so that when the latter is lowered toward the former, the spacers will uphold pipe section 14'' until the joint has been tack welded. The spacers are thus used to separate the two pipes or piles from complete abutment allowing penetration of the root pass of the weld.

The hydraulically powered alignment clamping device is particularly effective in facilitating the coaxial alignment and welding of the pipe piles. It will be understood that the hydraulic pressure initially supplied is such that springs 70 force the dogs 50'' slightly further apart than the diameter of pipe section 14'' until the latter pipe section is lowered into place. At this time, the hydraulic cylinders are operated for firmly engaging the two pipe sections whereupon tack welding is accomplished and the spacers 88 are then rotated to remove them out of the way for the complete weld.

Figure 6:
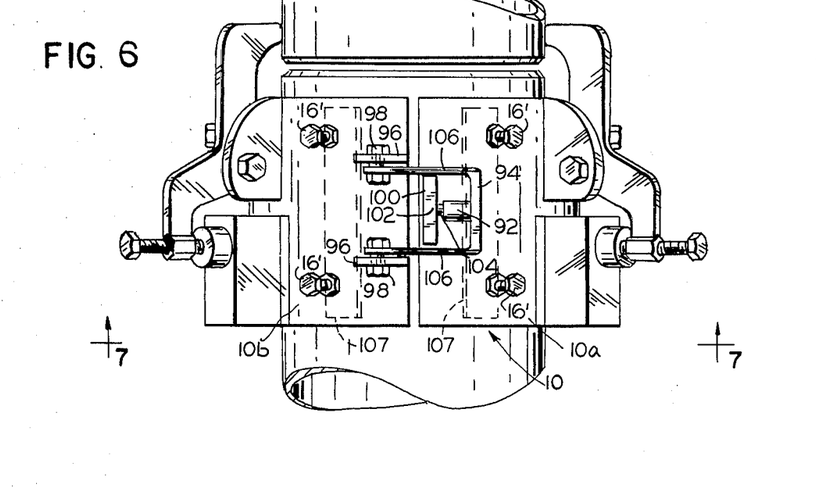
FIG. 6 is a side view of an alternative construction of a pipe alignment clamp according to the present invention including hydraulic locking means.
Figure 7:
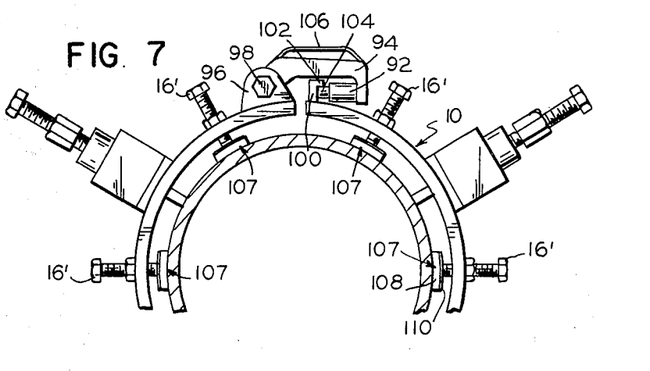
FIG. 7 is an end view partially broken away of the FIG. 6 device.
Figure 8:
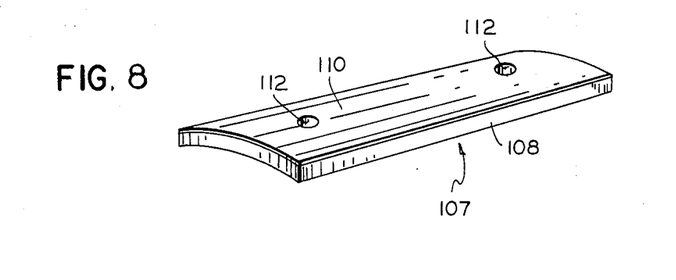
FIG. 8 is a perspective view of the softener shoe which may be employed in alignment clamps according to the present invention.

A further embodiment according to the present invention is illustrated in FIGS. 6 through 8, this embodiment illustrating additional or alternative features. In place of the previous locking device, a hydraulic locking device is employed which includes a hydraulic cylinder 92 mounted upon the U-shaped latch member 94. The latch member 94 is pivotally supported from upstanding ears 96 mounted upon semi-circular segment 10b of band 10 as by welding. Bolts 98 pivotally attach the latch member 94 to the ears. Also, the latch member is provided with handles 106 on the upper sides of the legs of the U. The latch member extends to the right in FIG. 6 past the location of a stop 100 welded onto semi-circular segment 10a and having a hooked portion 102 oriented to the right in FIG. 6 under which the piston rod 104 of hydraulic cylinder 92 may extend. The locking means of FIGS. 6 and 7 is operated by pivoting the latch member 94 into place so that the piston rod 104 is aligned underneath the hooked portion, and then operating hydraulic cylinder 92 such that the piston rod engages the stop 100. Hydraulic pressure from the cylinder 92 forces the semi-circular segments 10a and 10b toward one another. This device is suitable for use with heavy, large diameter pipes where the alignment clamping device itself is difficult to handle manually.

The embodiments of FIGS. 6 to 8 illustrate another variation according to the present invention which is desirable in the case of nonmetallic pipe surfaces, as for example epoxy coated pipe. Softener shoes generally indicated at 107 comprise a forward hard rubber surface 108 rounded or concave for engaging the outside of the pipe section and a rounded or concave rearward steel backing plate 110 provided with a pair of indentations 112 into which ends of longitudinally aligned centering bolts 16' may extend. It is understood one softener shoe is employed for a pair of centering bolts which are aligned toward the forward and rearward ends of the band 10.

Figure 9:
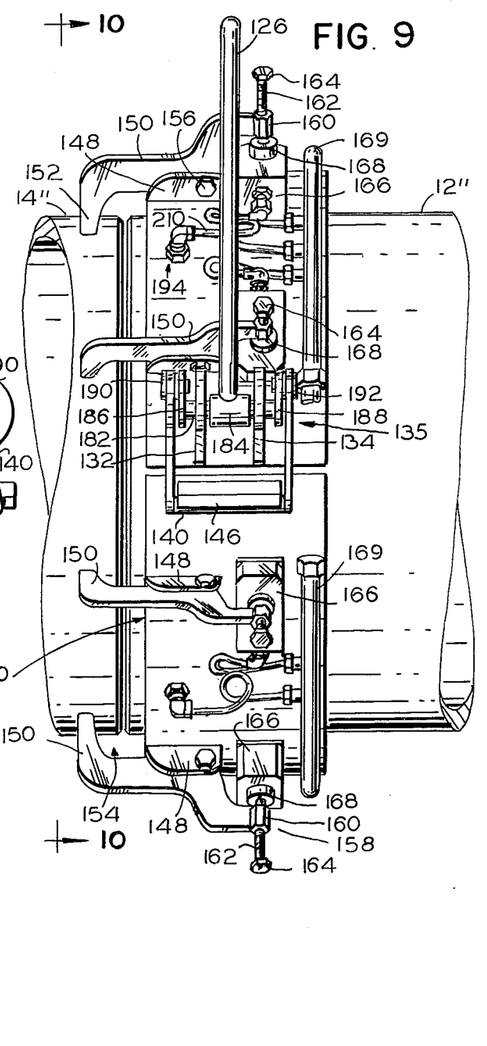
FIG. 9 is a side view of a pipe alignment clamp according to another aspect of the present invention.
Figure 10:
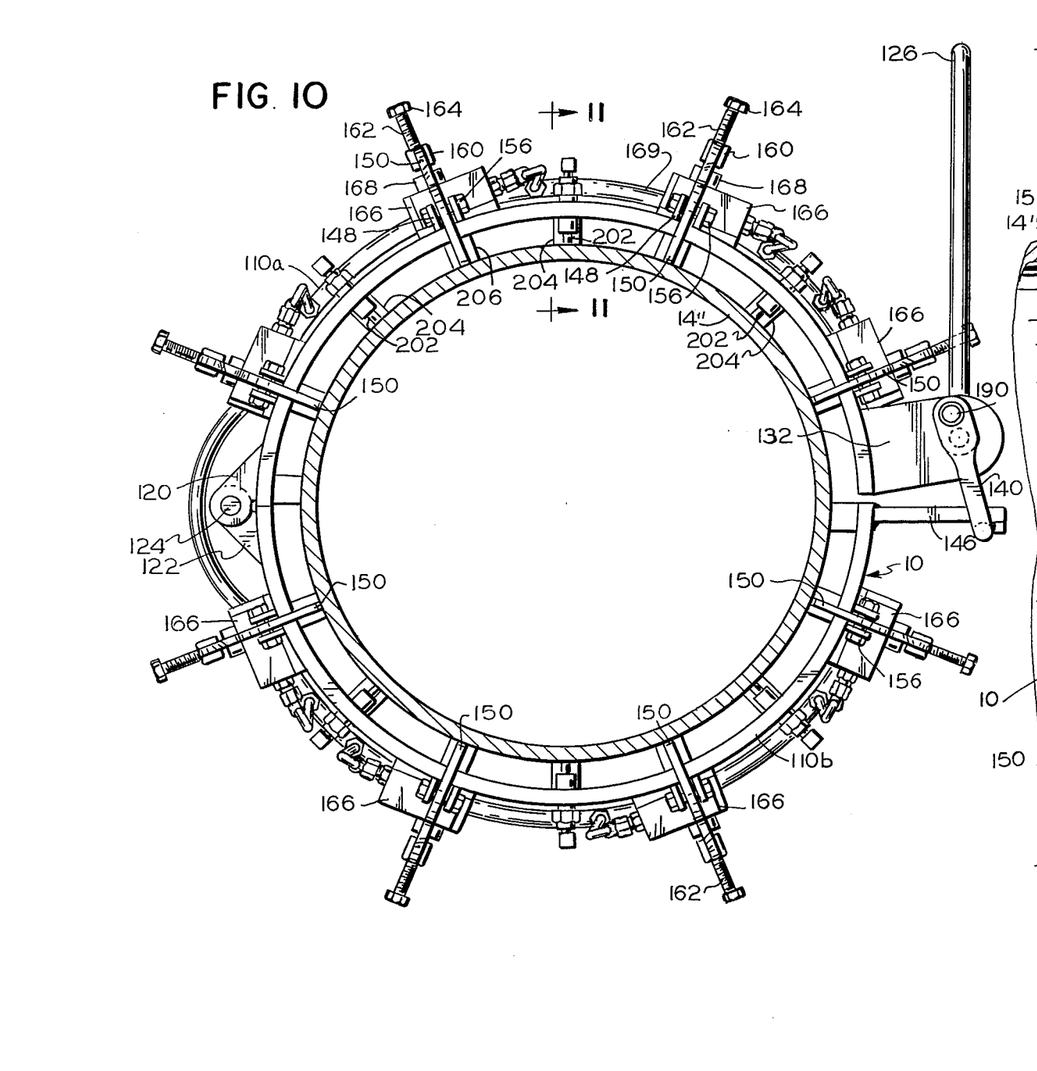
FIG. 10 is an end view of the FIG. 9 alignment clamp, such view being taken at 10—10 in FIG. 9.
Figure 11:
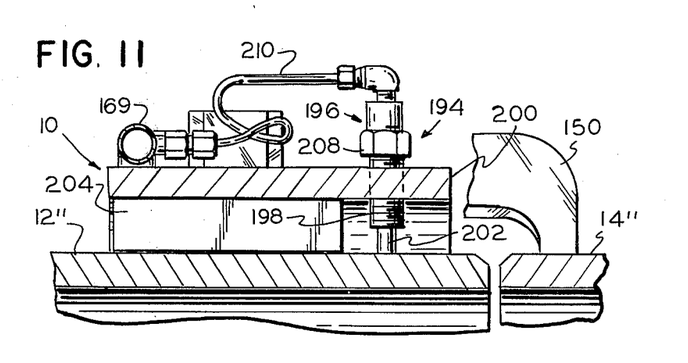
FIG. 11 is a partially broken away detail cross section of the FIG. 9 alignment clamp taken at 11—11 in FIG. 10.

In accordance with one aspect of the present invention, a pipe alignment clamp is provided which is particularly efficacious for clamping together larger sized pipe. Referring particularly to FIGS. 9 through 11, the band 10 is adapted for attachment to a first pipe section 12'' for bringing about alignment between the same and a second pipe section 14'' for facilitating the welding together of the pipe sections. The band 10 is composed of a pair of semi-circular segments 110a and 110b which are hingedly connected. Overlapping hinge brackets 120 and 122 are welded at ends of segments 110a and 110b respectively, proximate the forward and rearward edges thereof, and the brackets are joined by a pivot 124 extending therethrough in a direction parallel to the central axis of the band 10. Diametrically opposite pivot 124, the band is provided with a locking means 135 comprising a lever 126 secured to a shaft 182 turned by the lever. Shaft 182 is journaled for rotation within aligned apertures in ears 132 and 134 mounted upon the band 10, with lever 126 being received into a radial bore in a collar 184 secured upon shaft 182 between ears 132 and 134. On the outermost sides of ears 132 and 134, shaft 182 carries links 186 and 188 which in turn receive pivot pins 190 and 192 at aligned locations offset from the axis of shaft 182 for pivotally carrying the ends of a U-shaped hooking member 140. Member 140 is adapted to be received around an L-shaped lug mounted on semi-circular segment 110b. For locking the two segments 110a and 110b together, the hooking member 140 is rotated over the end of lug 146, when lever 126 rotated into a clockwise position (viewed from the direction from which the FIG. 10 cross section is taken). Then, the lever 126 is rotated in a counter clockwise direction, into an over-center locking position for at least preliminarily securing the band to the exterior of pipe 12''. A rotation stop (not shown) is also suitably provided for limiting counter clockwise rotation of the locking means in the locked, over-center condition. At this time, spacing means, secured to the inside of the band as hereinafter more fully described, engage the exterior of pipe section 12''.

Radially disposed about the band and toward the forward edge thereof, proximate the joint between the two pipe sections, are located pairs of upstanding steel ears 148, wherein each pair pivotally supports a lever type dog 150 having a forward end 152 adapted for grasping the side of a second pipe section 14''. The lever type dogs 150 are suitably positioned in opposing, diametrically opposite pairs. A total of eight are shown in this embodiment for the purpose of convenience in illustrating the joining of larger size pipes, although a large 48 inch diameter pipe, for example, is suitably joined with a device according to the present invention having approximately 24 or more such dogs mounted around the periphery of the band.

The lever type dogs extend radially outwardly from the first end thereof in the region of the joint between the two pipe sections to provide an access area generally indicated at 154 permitting welding of the joints between the two pipe sections. In the particular embodiment, each lever type dog is L-shaped between the first or forward end 152 and bolt 156, by means of which the dog is pivotally connected in each case to ears 148 positioned on either side thereof. Each lever type dog further extends radially outwardly from the pivot provided, and then longitudinally again to a second end 158 onto which a hex shaped threaded nut 160 is welded. Threadably adjustable rods 162 engage nuts 158 and are each provided with a hex head 164 whereby the opposite end of each rod 162 is adjustable toward and away from the axis of the band. Mounted below each rod 162 on band 10 is a hydraulic cylinder 166 for operating a hydraulic piston rod 168 in the direction of the adjustable rod 162, whereby to force the corresponding lever dog about the pivot established by bolt 156 causing the first end 152 thereof to grasp the exterior of second pipe section 24″. The hydraulic cylinders 166 are supplied hydraulic fluid via a line 169 which suitably connects to a pump in the manner described hereinbefore. The dogs are also suitably provided with coil springs as hereinbefore described for cocking the forward ends of the dogs upwardly until hydraulic pressure is applied to cylinders 166.

The interior of band 10 in the embodiment of FIGS. 9 through 11 is provided with a plurality of spacing means for engaging the exterior of pipe section 12″ when lever 126 is locked. As particularly illustrated in FIG. 11, each such spacing means comprises a hydraulic cylinder and piston means 194 including a hydraulic cylinder 196 having a threaded shank 198 received through a matching threaded bore in the wall of band 10 substantially adjacent the forward edge 200 of band 10, i.e. the edge of the band next to pipe section 14″. Cylinder 196 is provided with a hex head 208 for adjustably securing the cylinder 196 into the threaded bore provided in band 10. Each cylinder receives hydraulic fluid via a connection 210 from the same hydraulic line 169 by means of which hydraulic cylinder 166 is operated. The cylinder operates a radially inwardly directed piston 202 for bearing on the outside wall of pipe section 12″. The spacing means further includes a plurality of bars 204 joined to the inside of the band and extending in a direction parallel to the axis of the band in substantial alignment with the hydraulic cylinder and piston means 194. Sets of spacing means 194, 204 are suitably located circumferentially on the band between pairs of lever type dogs as can be seen in FIG. 10.

The spacing means on the interior side of the band suitably also includes further bars 206 disposed around the inside of the band and alternating with the first mentioned bars. These further bars are suitably located under and in alignment with the lever type dogs 150 and extend in a direction parallel to the axis of the band for nearly the entire axial dimension of the band.

In employment of the device of FIGS. 9–11, the band, in unlocked open condition, is placed upon the pipe section 12″. Then, the locking means is operated by inserting member 140 around lug 146, and rotating the lever 126 for drawing up the band and producing substantially firm engagement between bars 204, 206 and pipe section 12″. The second pipe section 14″ is moved into approximate coaxial relation with the first pipe section 12″, and then hydraulic pressure is supplied via line 169 for pivoting the dogs so that first ends 152 grasp the pipe sections 14″ in coaxial relation. At the same time, hydraulic cylinders 196 operate pistons 202 for placing band 10 under increased tension for preventing the formation of an out-of-round condition in band 10. In the case of larger bands employed for securing larger pipe sizes, it is found that torsional forces around the band when dogs 150 are operated tend to lift portions of the band away from pipe section 12″, e.g. when the dogs contact a high-low condition in pipe section 14″. Raising the band at one point tends to draw the band further inwardly at other points whereby the situation may be accentuated. The addition of spacing means comprising hydraulic cylinder and piston means 194 places the band under radially outwardly directed tension for maintaining the support therefor and enabling the lever type dogs to bring pipe section 14″ into alignment with pipe section 12″. While in the case of larger pipe sizes it is not always possible to force both pipes into a perfectly cylindrical condition, the apparatus is designed to distribute discrepancies evenly over the periphery of the joint and enable the welding of the two pipe sections together.

Figure 12:
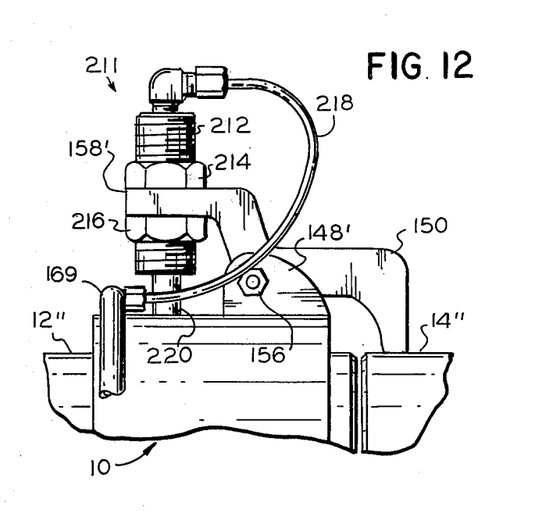
FIG. 12 is a partially broken away detailed view of operating means for movable alignment clamp dogs according to another embodiment of the present invention.

Referring to FIG. 12, illustrating an alternative hydraulic operating means 211 for the movable dogs, such means comprises a hydraulic cylinder 212 provided with a threaded exterior and extending through an aperture in end 158′ of dog 150. The threaded cylinder receives a pair of mating nuts 214 and 216 which are drawn up against the end 158′ of dog 150 for holding the hydraulic cylinder in place. The hydraulic cylinder is also provided with a piston 210 which bears on the exterior side of band 10, and a hydraulic connection 218 which connects with hydraulic line 169 for receiving hydraulic fluid therefrom. The construction illustrated in FIG. 12 is advantageous from the standpoint of replacement of hydraulic cylinders and also, of course, facilitates adjustment of the relative positions of dogs 150 by the adjustable positioning which may be accomplished by the securing of nuts 214 and 216 at different selectable locations along the cylinder 212.

Figure 13:
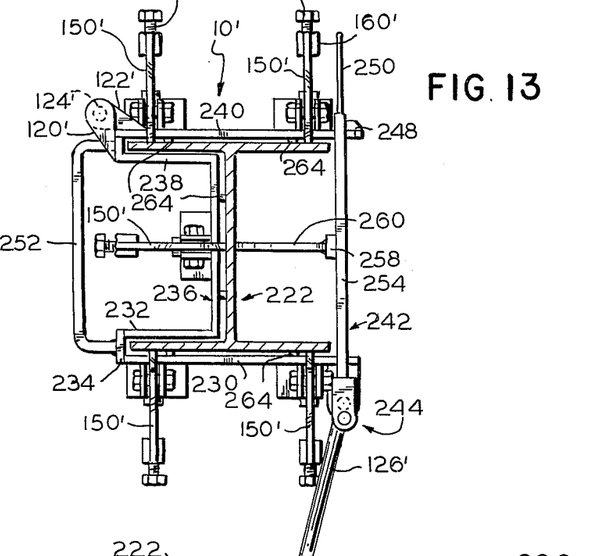
FIG. 13 is an end view of yet another alignment clamp according to the present invention for aligning structural shape sections wherein one said structural shape section is shown in cross section.
Figure 14:
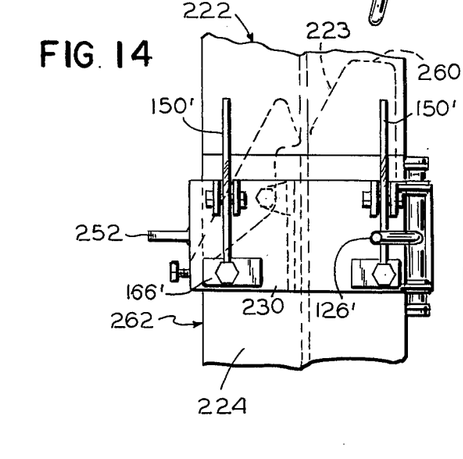
FIG. 14 is a side view of the FIG. 13 alignment clamp.
Figure 15:
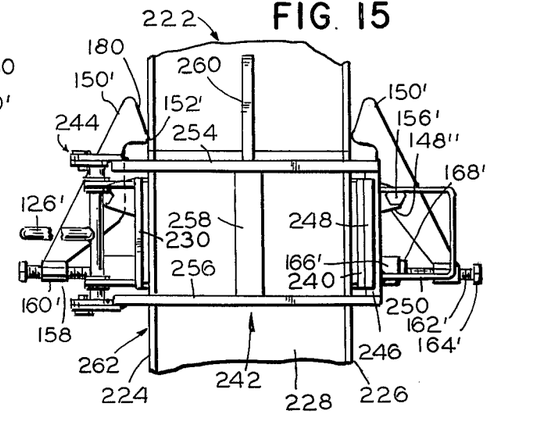
FIG. 15 is an end view of the FIG. 13 alignment clamp.

FIGS. 13–15 illustrate a further embodiment according to the present invention comprising a clamping device adapted for holding two structural shapes or portions of structural members in alignment for welding together. Examples of strucutral shapes are I-beams, H-beams, angles and the like. The device is illustrated as clamping together two H-beams 226 and 262 which suitably comprise sections of piling. The device according to this embodiment of the present invention comprises an outer band 10′ for surrounding the exterior of the cross sectional outline of beam 262, and in the illustrated embodiment comprises at least four legs 230, 236, 240 and 242, completing a basically rectangular configuration with at least one leg, 236, being indented to match the web 228 of the H-beam. Legs 230, 236 and 240 comprise steel plates which engage or bear against portions of H-beam 262 by means of intervening spacing means consisting of vertically oriented bars 264 welded to the inward side of the respective legs. As illustrated, there are suitably two such bars provided for each leg.

First leg 230 extends along the outside of flange 224, while a second leg 236, which is connected to leg 230, is disposed at right angles to leg 230 and extends in engaging relation along one side of web 228 of the H-beam 262. The leg 236 is suitably U-shaped and is provided with a pair of extensions 232 and 238 for completing a V-shaped configuration, with extension 232 being joined to leg 230 by means of link 234 welded therebetween and disposed adjacent the edge of flange 224. A bracing bar 252 is welded between link 234 and the end of extension 238 upon which hinge bracket 120′ is mounted.

Extension 238 is joined to third leg 240 positioned along flange 226 by means of a hinge connection comprising overlapping hinge brackets 120′ and 122′ welded at side edges of extension 238 and leg 240 respectively. The brackets 120' and 122' are joined by a pivot 124' extending therethrough. A fourth leg 242 is hingedly and latchingly connected between the first leg 230 and the fourth leg 240. In the particular embodiment, leg 242 comprises parallel bars 254 and 256 centrally joined by perpendicular brace 258, where the aforesaid bars 254 and 256 are hingedly connected to leg 230 by means of an over-center locking hinge arrangement 244 provided with an operating handle 126' and operable in substantially the same manner as the locking means 135 illustrated for band 10 in FIGS. 9 and 10. The remote ends of bars 254 and 256 are joined by a hooking member 246 adapted for engagement over hooking lug 248 joined to leg 240. Thus, to secure the band 10' in place, lever 126' (as viewed in FIG. 13) is rotated in a counter clockwise direction allowing movement of member 246 behind lug 248. Member 246 is provided with an operating handle 250 for convenience in swinging the same over lug 248. Then, the lever 126 is rotated to its over-center locking position for securing the legs 242 in place. The bars 254 and 256 together with member 246 function in the same manner as U-shaped hooking member 140 in FIGS. 9 and 10.

Legs 230, 236 and 240 are each provided with at least one lever type dog 150' mounted upon band 10' and adapted for grasping corresponding portions of beam 222. Each of the dogs is pivotally engaged between upstanding steel ears 148'' welded on to the sides of the legs wherein a bolt 156' extending between a pair of ears pivotally carries one of the dogs. A forward end 152' of each dog engages beam 222 while the remote end 158' of the dog including threaded member 160' engages a rod 162' provided with a hex head 164', wherein the lower end of rod 162' engages a piston rod 168' of a hydraulic cylinder 166' mounted on the side of the leg. The hydraulic cylinders are connected in common by means now shown to a source of hydraulic fluid for causing simultaneous operation of the lever type dogs in the manner hereinbefore described in regard to previous embodiments of the invention. Also, the dogs in this embodiment taper outwardly at 180 to provide a stabbing guide configuration for initially engaging beam 222. As beam 222 is lowered toward beam 262, the tapered region 180 of the lever dogs guide the beam 222 into place.

In the particular embodiment, leg 230 is provided with two lever type dogs for engaging the outside of a first flange of beam 222, leg 240 is provided with two lever type dogs for engaging the outside of a second flange of beam 222, and leg 236 is provided with a single dog for engaging the web of beam 222 on one side thereof. On the remaining side thereof, a bracing bar 260 is joined to brace 258 and is adapted for engaging the remaining side of the web of both beams 222 and 262. This bracing bar also has a tapered upper edge 223 which acts as a stabbing guide for guiding the placement of beam 222 in the same manner as described relative to the lever dogs.

In operation of the embodiment of FIGS. 13–15, the band 10' in completely open formation, i.e. with leg 240 rotated in a counter clockwise direction and with leg 242 rotated in a clockwise direction, is positioned upon the cross section of vertically oriented beam 262 adjacent the upper end thereof with legs 230 and 236 engaging the beam. Now, legs 240 and 242 are swung together with member 246 being engaged behind lug 248. Lever 126' is swung into its over-center locking position as illustrated in FIG. 13 for completing the attachment of the device to beam 262. As thus appears, legs 230 and 236 together form a first portion of band 10' while leg 240 forms a second portion hingedly related to the first, and leg 242 provides means for holding said portions together in clamping relation with beam 262. With the dogs substantially open, a second beam 222 is lowered into place and the hydraulic cylinders 166' are operated causing the dogs to engage and hold upper beam 222 so that the same may be welded to lower beam 262.

While I have shown and described several embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. A device for holding two sections of pipe in alignment for welding one to the other, said device comprising:
   a circumferential band removably securable to a first of said sections of pipe which is to be welded to a second of said sections of pipe, said band including radially inwardly directed spacing means for bearing upon the first of said sections of pipe, said spacing means comprising hydraulic cylinder and piston means operable for tensioning said band relative to said first of said sections of pipe,
   movable dogs mounted from said band and having forward ends for engaging the second of said sections of pipe, said dogs extending outwardly of the region of the joint between the two pipe sections to permit welding between the pipe sections,
   and operating means interengageable between said band and said movable dogs for bringing about the movement of the forward ends of said dogs toward the second of said pipe sections in supporting relation to the second of said pipe sections.

2. The device according to claim 1 wherein said operating means comprises hydraulic cylinders mounted on said band and provided hydraulic fluid in common with said hydraulic cylinder and piston means.

3. The device according to claim 2 wherein said band is provided with support means secured to said band and pivotally supporting said movable dogs, and wherein said hydraulic cylinders are mounted upon said band on the remote side of said support means from said forward ends of said dogs.

4. The device according to claim 1 wherein said band comprises a pair of hingedly connected segments provided with means for holding the sections together in clamping relation with the first of said pipe sections.

5. The device according to claim 1 wherein said spacing means further includes a plurality of bars joined to the inside of said band, said hydraulic cylinder and piston means comprising a plurality of hydraulic cylinders secured to said band adjacent the forward edge of said band next to the second of said sections of pipe, the pistons of said hydraulic cylinder and piston means extending radially inwardly for bearing upon the said first of said sections of pipe.

6. The device according to claim 5 wherein said bars are adjacent said hydraulic cylinder and piston means and are located between the hydraulic cylinder and piston means and the rearward edge of said band.

7. The device according to claim 5 wherein said spacing means includes further bars for bearing on the first of said pipes and disposed around the inside of said band, said further bars alternating between the first mentioned bars and said hydraulic cylinder and piston means.

8. The device according to claim 1 wherein said operating means comprises hydraulic cylinders mounted upon said movable dogs, each hydraulic cylinder being provided with a piston having an operating relationship with the side of said band.

9. The device according to claim 8 wherein said hydraulic cylinders are provided with a threaded exterior for mounting the same to a said movable dog.

10. A device for holding two sections of pipe in alignment for welding one to the other, said device comprising:
  a circumferential band removably securable to a first of said sections of pipe which is to be welded to a second of said sections of pipe,
  movable dogs mounted from said band and having forward ends for engaging the second of said sections of pipe, said dogs extending outwardly of the region of the joint between the two pipe sections to permit welding between the pipe sections,
  and operating means interengageable between said band and said movable dogs for bringing about the movement of the forward ends of said dogs toward the second of said pipe sections in supporting relation to the second of said pipe sections, wherein said operating means comprises hydraulic cylinders mounted on said movable dogs wherein said hydraulic cylinders are provided with piston means for bearing against said band.

11. The device according to claim 10 wherein said hydraulic cylinders are exteriorly threaded for joining the same to said movable dogs.

12. A device for holding two structural shapes in alignment for welding one to the other, such device comprising:
  an outer band for surrounding a first said structural shape, said outer band being removably securable to said first structural shape,
  said outer band having a configuration similar to the exterior cross sectional outline of said first structural shape,
  movable dogs mounted from said band and having forward ends for engaging a second of said structural shapes, said dogs extending outwardly of the region of the joint between the two structural shapes to permit welding between the structural shapes,
  and operating means interengageable between said outer band and said movable dogs for bringing about the movement of the forward ends of said dogs toward the second of said structural shapes in supporting relation to the second of said structural shapes.

13. The device according to claim 12 adapted for holding two structural shapes in alignment wherein said outer band includes leg portions shaped for juxtaposition adjacent angularly related components of said structural shape, leg portions of said band being divided into a pair of hingedly connected portions and means for holding the hingedly connected portions together in clamping relation with a first said structural shape.

14. The device according to claim 12 wherein said band is provided with interior bars for bearing upon the first of said structural shapes.

15. The device according to claim 12 adapted for holding two structural shapes in alignment wherein said structural shapes each comprise end flanges joined by a web,
  said outer band including a first leg adapted for bearing against a first flange of a first of said structural shapes and provided with at least one movable dog for engaging a first flange of the second of said structural shapes,
  a second leg angularly connected to the first leg for bearing against a web of the first of said structural shapes and having a movable dog mounted therefrom for engaging the web of the second of said structural shapes,
  a third leg hingedly joined to said second leg for bearing against the remaining flange of the first of said structural shapes and having at least one movable dog for engaging the remaining flange of the second of said structural shapes,
  and a fourth leg hingedly and latchingly connected between said first leg and said third leg, said fourth leg being provided with means for engaging the remaining side of the web of said first and second structural shapes.

16. The device according to claim 15 wherein said second leg is U-shaped for reaching the web of said first and second structural shapes.

17. The device according to claim 16 further including a bracing bar joined across the open end of said second U-shaped leg.

* * * * *